(12) United States Patent
Mansfield et al.

(10) Patent No.: US 11,870,140 B2
(45) Date of Patent: Jan. 9, 2024

(54) ANTENNA-EQUIPPED LIGHT BAR

(71) Applicant: Code 3, Inc., St. Louis, MO (US)

(72) Inventors: Todd Mansfield, Boise, ID (US); Kyle Christopher Stuesse, O'Fallon, MO (US); Nicholaus M. Thompson, Kuna, ID (US)

(73) Assignee: Code 3, Inc., St. Louis, MO (US)

( * ) Notice: Subject to any disclaimer, the term of this patent is extended or adjusted under 35 U.S.C. 154(b) by 249 days.

(21) Appl. No.: 17/595,187

(22) PCT Filed: May 13, 2020

(86) PCT No.: PCT/US2020/032735
§ 371 (c)(1),
(2) Date: Nov. 10, 2021

(87) PCT Pub. No.: WO2020/232163
PCT Pub. Date: Nov. 19, 2020

(65) Prior Publication Data
US 2022/0200138 A1    Jun. 23, 2022

Related U.S. Application Data

(60) Provisional application No. 62/847,230, filed on May 13, 2019.

(51) Int. Cl.
*H01Q 1/32* (2006.01)
*F21S 45/10* (2018.01)
*B60Q 1/00* (2006.01)
*B60Q 1/26* (2006.01)
*H01Q 1/52* (2006.01)

(52) U.S. Cl.
CPC ......... *H01Q 1/3275* (2013.01); *B60Q 1/0017* (2013.01); *B60Q 1/2611* (2013.01); *F21S 45/10* (2018.01); *H01Q 1/526* (2013.01)

(58) Field of Classification Search
CPC .... H01Q 1/3275; H01Q 1/526; B60Q 1/0017; B60Q 1/2611; F21S 45/10; G08G 1/0965; G08G 1/0955; G08G 1/096791; G08G 1/161
See application file for complete search history.

(56) References Cited

U.S. PATENT DOCUMENTS

| | | | |
|---|---|---|---|
| 5,884,997 A | 3/1999 | Stanuch et al. | |
| 6,225,956 B1 | 5/2001 | Bradley | |
| 9,002,313 B2 | 4/2015 | Sink et al. | |
| 9,432,068 B2 | 8/2016 | Stählin | |
| 9,499,095 B1 | 11/2016 | Buehler et al. | |
| 2007/0195939 A1* | 8/2007 | Sink | B60Q 1/2611 379/37 |
| 2011/0006965 A1* | 1/2011 | Kits van Heyningen | H01Q 1/42 343/872 |
| 2012/0201041 A1 | 8/2012 | Gergets et al. | |
| 2015/0280316 A1 | 10/2015 | Iso | |

(Continued)

OTHER PUBLICATIONS

International Search Report and Written Opinion for PCT/US2020/032735, dated Aug. 6, 2020, 9 pages.

*Primary Examiner* — David E Lotter
(74) *Attorney, Agent, or Firm* — Stoel Rives LLP

(57) ABSTRACT

Disclosed is a light bar having improved weather resistance, aerodynamics, antenna performance, and platform versatility by accommodating user-selectable antenna modules.

29 Claims, 6 Drawing Sheets

(56) References Cited

U.S. PATENT DOCUMENTS

2017/0054204 A1\* 2/2017 Changalvala ............ H01Q 1/42
2017/0270786 A1 9/2017 Swaminathan et al.
2017/0317408 A1 11/2017 Hamada et al.

\* cited by examiner

| | 341-700<br>(3 Element)<br>DANLAW | LLP-502<br>(7 Element) | LLP-304<br>(3 Element) | LTM-502<br>(9 Element) |
|---|---|---|---|---|
| GPS | 1 | 1 | 1 | 1 |
| LTE (First Net) | | 2 | 1 | 4 |
| WiFi | | 4 | | 4 |
| DSRC (V2X) | 2 | | | |
| 450 UHF (Motorola Radio) | | | 1 | |
| Satellite Phone | | | | 1 |

FIG. 5

ANTENNA-EQUIPPED LIGHT BAR

RELATED APPLICATION

This application is a National Stage of International Application No. PCT/US2020/032735, filed May 13, 2020, which claims priority benefit of U.S. Provisional Patent Application No. 62/847,230, filed May 13, 2019, which are hereby incorporated by reference in their entirety.

TECHNICAL FIELD

This disclosure relates generally to light bars having one or more antennas and, more particularly, to an antenna-equipped light bar suitable for vehicle-to-everything (V2X) communications.

BACKGROUND INFORMATION

V2X communication means wirelessly transmitting and receiving information between a vehicle and another entity that may affect the vehicle. V2X encompasses different types of communication use-cases such as road safety, traffic efficiency, and energy savings that include vehicle-to-infrastructure (V2I), vehicle-to-network (V2N), vehicle-to-vehicle (V2V), vehicle-to-pedestrian (V2P), vehicle-to-device (V2D), vehicle-to-grid (V2G) communications, and cellular V2X (C-V2X).

The wireless communications protocols and physical layers employed in V2X are based on wireless wide area network (WWAN, e.g., cellular) or wireless local area network (WLAN, e.g., Wi-Fi) technologies. Standardization of WLAN-based V2X supersedes that of cellular-based V2X systems. In 2012, for instance, the Institute of Electrical and Electronics Engineers (IEEE) published the specification of WLAN-based V2X (IEEE 802.11p). The specification describes direct communication between vehicles (i.e., V2V) and between vehicles and infrastructure (i.e., V2I). The standard has been adopted for Dedicated Short Range Communication (DSRC), which employs the underlying radio communication techniques set forth in IEEE 802.11p.

The Society of Automotive Engineers (SAE) published the J2735 standard (revised March 2016) that specifies a message set, its data frames, and it data elements specifically for use by applications intended to utilize the 5.9 GHz band for DSRC for Wireless Access in Vehicular Environments (DSRC/WAVE, referenced in this document simply as DSRC) communications systems.

The SAE J2945™/1 standard (revised March 2016) specifies system requirements for an on-board vehicle-to-vehicle (V2V) safety communications system for light vehicles, including standards profiles, functional requirements, and performance requirements. A specified system should be capable of transmitting and receiving the J2735-defined Basic Safety Message (BSM) over a DSRC wireless communications link as defined in the IEEE 1609 suite and IEEE 802.11 standards. The J2945™/1 standard addresses the on-board system needs for ensuring that the exchange of BSMs in V2V safety communications provides the desired interoperability and data integrity to support the performance of safety applications.

SUMMARY OF THE DISCLOSURE

Disclosed is a light bar having improved weather resistance, aerodynamics, antenna performance, platform versatility by accommodating user-selectable antenna modules, and enhanced roadside control (e.g., traffic signal preemption) and situational awareness.

An antenna-equipped light bar comprises a light bar housing in which are mounted lighting devices communicatively coupled to electrical circuitry; a shielding panel located in the light bar housing and electrically isolated from the electrical circuitry coupled to the lighting devices, the shielding panel positioned in the light bar housing to provide shielding of electromagnetic interference (EMI) associated with the electrical circuitry coupled to the lighting devices; and an antenna mounted atop the shielding panel so as to be at least partly shielded from the EMI.

In some embodiments, the antenna-equipped light bar further comprises a cover for the light bar housing, the cover including a domed region and a major surface region, the domed region defining an interior cavity for which at least a portion of the interior cavity is located above a plane defined by the major surface region.

In other embodiments, at least a portion of the antenna is located in the interior cavity and above the plane.

In further embodiments, the domed region is centrally located in the cover.

In some other embodiments, the shielding panel is integrated into the cover.

In yet other embodiments, the lighting devices are mounted at locations below the shielding panel.

In further embodiments, the antenna comprises a multi-element antenna module.

In some embodiments, the antenna includes a cellular antenna configured for cellular V2X wireless communications.

In another embodiment, the shielding panel includes one or more lateral shielding panels and central ground plane on which the antenna is mounted.

A system including the antenna-equipped light bar comprises a human-machine interface (HMI), and an on-board unit for converting from first electrical signals into second electrical signals, the first electrical signals being generated by the HMI indicating that the lighting devices are on, and the second electrical signals being generated by the on-board unit for wireless broadcast using the antenna.

In one embodiment, the HMI triggers the on-board unit to cause the antenna to wirelessly broadcast a J2735 light bar in use data element.

In another embodiment, the HMI triggers the on-board unit to cause the antenna to wirelessly broadcast a J2735 emergency vehicle alert message.

Additional aspects and advantages will be apparent from the following detailed description of embodiments, which proceeds with reference to the accompanying drawings.

BRIEF DESCRIPTION OF THE DRAWINGS

FIG. 5 is table including pictorial views of several antenna modules represented in FIG. 3.

DETAILED DESCRIPTION OF EMBODIMENTS

The present inventors recognized that previous attempts at integration of antennas in light bars have had deficiencies. For example, two previous attempts are described in U.S. Pat. No. 9,002,313 of Sink et al. and Pub. No. US 2017/0270786 of Swaminathan et al.

The '313 patent describes transceivers atop circuit boards in a lower well of a light bar housing. Cables from the transceivers are first threaded through apertures in a shielding panel and then coupled to corresponding antennas extending through vias in an upper solar panel and cover of the light bar housing. The antennas, however, are exposed to the weather and the light bar housing is susceptible to water intrusion through broken seals in the vias.

The '786 publication describes a DSRC antenna module positioned within the housing and atop a circuit board, which would appear to reduce the likelihood of water intrusion. This configuration, however, lacks the shielding panel and instead has the antenna mounted on a common plane with lighting devices in close proximity to the antenna. Accordingly, the lighting devices could contribute to wireless signal interference. Furthermore, the antennas are placed relatively low near the bottom of the light bar housing and are substantially laterally offset from center. This location potentially introduces occlusions causing null points or otherwise compromises signal-to-noise.

Figure 1:
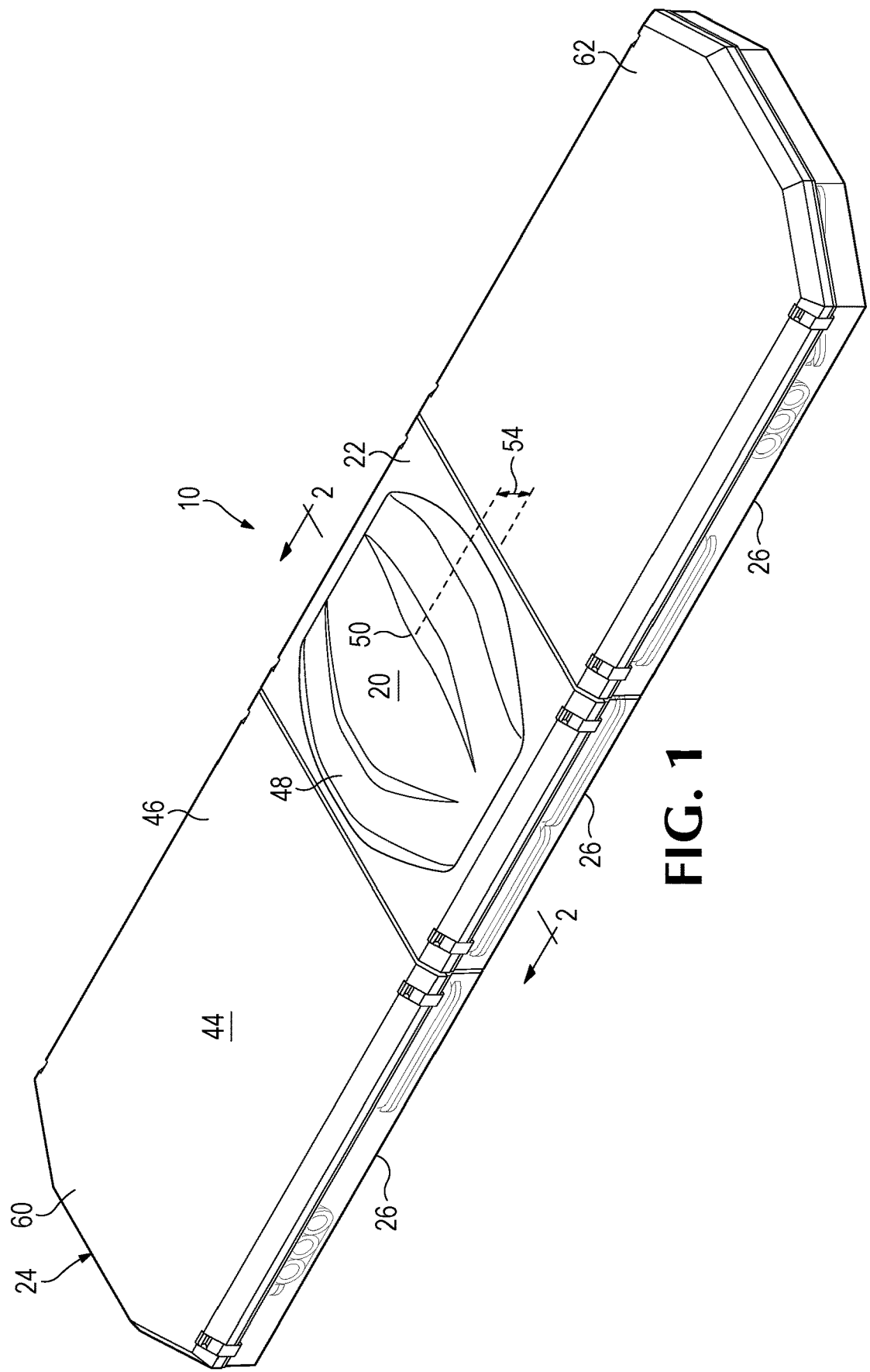
FIG. 1 is an isometric view of a light bar, according to one embodiment.

FIG. 1 shows an exterior of a light bar 10 having an integrated V2X antenna module 14 shown in more detail in FIGS. 2-6. As described in this disclosure, light bar 10 includes several features for optimization of its weather resistance, aerodynamics, antenna performance, platform versatility for user-selectable antenna modules, and enhanced roadside control (e.g., traffic signal preemption) and situational awareness.

Figure 2:
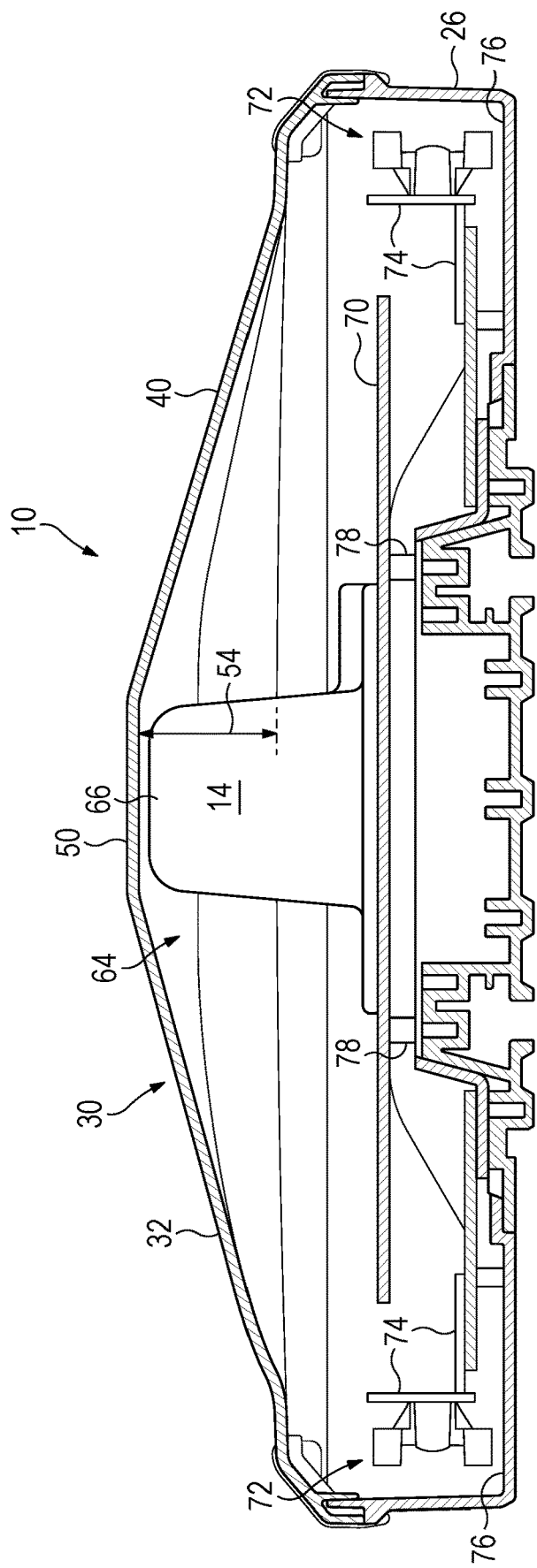
FIG. 2 is a cross-sectional view taken along lines 2-2 of FIG. 1.

With respect to weather resistance, FIGS. 1 and 2 show how light bar 10 includes a domed (or hooded) region 20 centrally located in a middle segment 22 of a removable upper cover 24. Central dome 20 is sized to accommodate antenna module 14 within a light bar housing 26, such that antenna module 14 is unexposed to weather.

With respect to aerodynamics, FIG. 2 shows central dome 20 also has a streamlined cross-sectional shape 30 that is contoured to reduce drag. For example, cross-sectional shape 30 has a leading edge 32 that resembles the shape of an airfoil. It is slightly more blunt than a gradual ramp of a trailing edge 40 extending toward an exterior surface 44 (FIG. 1) of removable upper cover 24, which generally defines a plane 46.

FIG. 1 also shows that, extending above plane 46 for facilitating improved antenna performance, are a lower, wider base section 48 and an upper, narrower apex section 50 of central dome 20. Specifically, central dome 20 has a height 54 exceeding that of a left lateral segment 60 and a right lateral segment 62 of removable upper cover 24.

A hollow recess or cavity 64 (FIG. 2) is located under central dome 20, i.e., inside light bar housing 26. Cavity 64 is of sufficient height and volume so that an upper portion 66 of a desired antenna module 14 optionally extends above two lateral segments 60 and 62. The differences in heights reduce occlusions. Furthermore, central dome 20 is formed in a middle segment 22 (i.e., not laterally offset in the present embodiment) such that antenna module 14 is capable of receiving and transmitting fairly consistent wireless signal strength from both any azimuthal directions about an authorized, light bar-equipped vehicle.

As shown in FIG. 2, antenna module 14 is mounted atop a ground plane 70 that acts as a shielding panel to provides shielding from lighting devices 72 and associated circuit boards 74 and wiring near a floor 76 of light bar housing 26. For example, ground plane 70 sits on posts 78 that electrically isolate antenna module 14 from other electrical circuitry of light bar 10. Wiring and electronics are neatly stowed under the shielding, i.e., ground plane 70 is substantially above the majority of such circuitry so as to reduce electromagnetic interference with radiated wireless signals. Skilled persons will appreciate, however, that a precise position of ground plane 70 with respect to lighting devices 72 may be adjusted somewhat for different implementations. For instance, FIG. 2 shows that ground plane 70 is about level with the tops of lighting devices 72 so as to provide more clearance under dome 20 (or for fitment in domes having less height 54) whereas lateral shielding panels 80 (FIGS. 3 and 4) are fully above the level of lateral lighting devices 82.

In another embodiment (not shown), lateral shielding panels 80 are integrated in and removable with two lateral segments 60 and 62 of removable upper cover 24. Because dome 20 extends above the height of these segments, they may include integral metal shielding on their interior surfaces to block interference while remaining well beneath antenna elements under dome 20.

Figure 4:
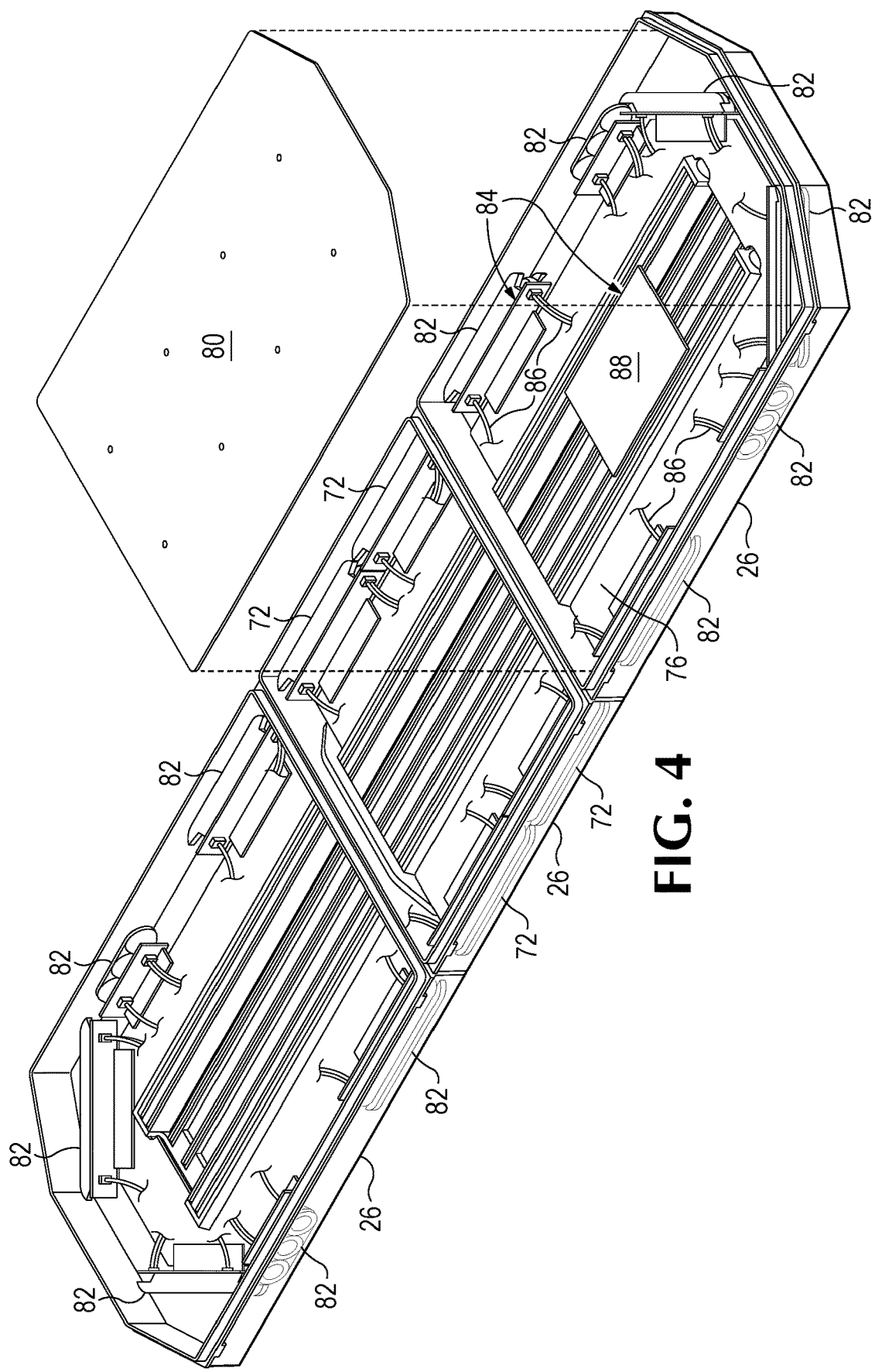
FIG. 4 is another partly exploded isometric view showing a shielding panel removed from the light bar.

FIG. 4 shows in greater detail an example of lighting devices 72 and 82 communicatively coupled to electrical circuitry 84, which in some embodiments includes electrical wiring 86 (illustrated with fragmentary views), a main driver board 88 having IC and electronic components mounted thereon, and associated wiring harnesses (not show). Electrical circuitry 84 is mounted such that it is stowed under shielding panels 80 (center ground plane 70 and left side shielding panel 80 are not shown). Specifically, main driver board 88 is mounted atop rails in floor 76 that run alongside a central trough through which electrical wiring 86 is routed to and from main driver board 88 and any associated wiring harness. The location of electrical circuitry 84 under shielding provided by plane 70 and panels 80, and the location of antenna module 14 above the such shielding, facilitate a reduction in electromagnetic interference (EMI) radiated from electrical circuitry 84 actuating lighting devices 72 and 82 that would otherwise reduce the signal-to-noise ratio (SNR) of antenna module 14.

Figure 3:
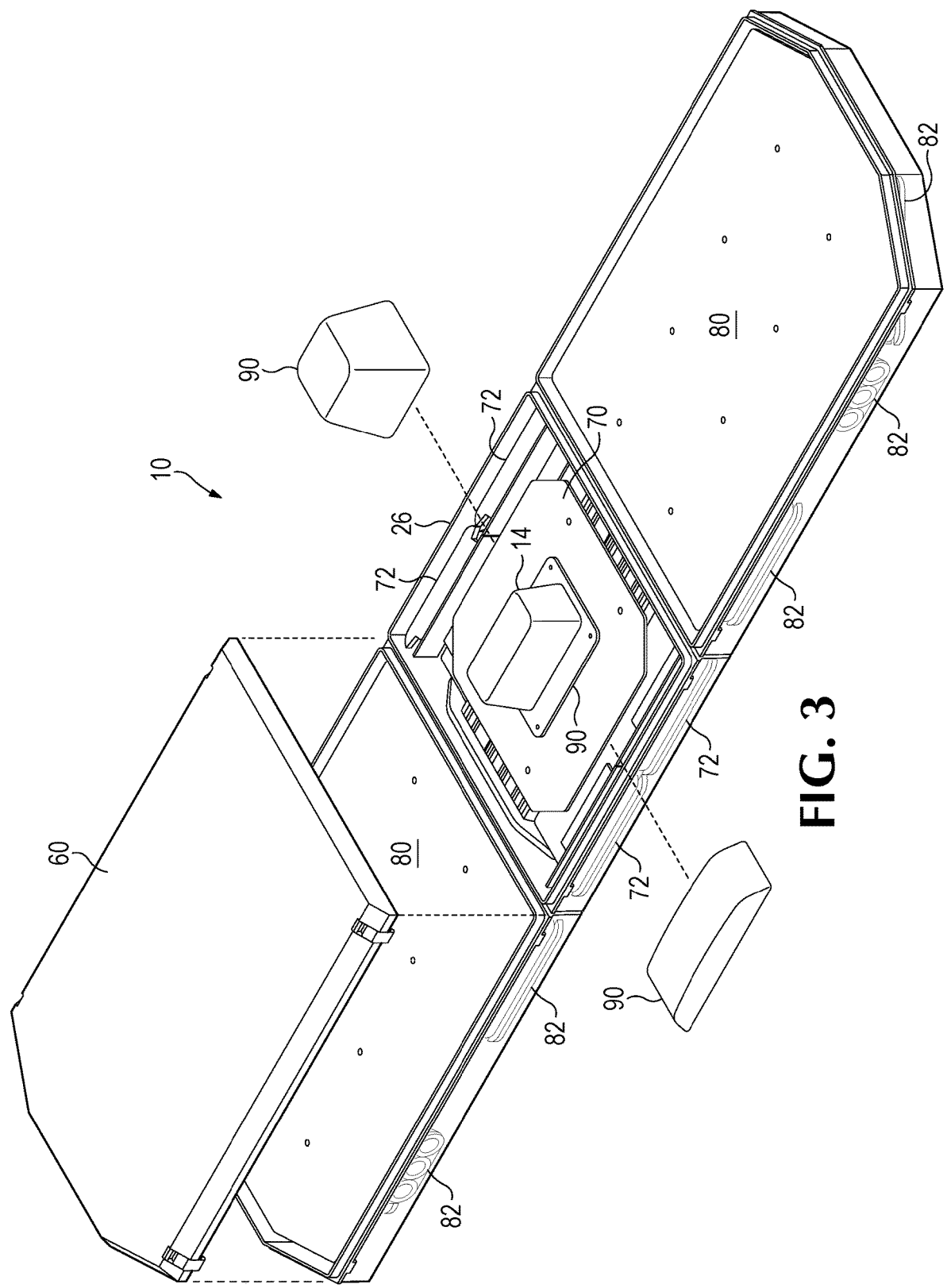
FIG. 3 is a partly exploded isometric view of the light bar of FIG. 1 showing different user-selectable antenna modules that may be deployed in the light bar.

FIGS. 3 and 5 also show how light bar 10 acts as an antenna module platform because it is configured to accommodate different user-desired antenna modules 90. As shown in FIG. 5, antenna modules include enclosures having therein one or more antenna elements and signal cables. Some antenna modules are capable of supporting transmission and reception via FM, AM, satellite, two-way radio, radar, cellular, RFID, Bluetooth, Wi-Fi, ZigBee, GPS, or DSRC, as well as analog RF communications schemes.

FIG. 5 shows four examples of antenna modules 90 for multiband communication. Antenna module 14 is shown on FIG. 5 as a three element antenna module available from Danlaw Inc. of Novi, Mich. Similarly, LLP-502, LLP-304, and LTM-502 also fit within cavity 64 and are multiband, surface mount modules available from Mobile Mark, Inc. of Itasca, Ill. Such antenna modules facilitate wireless communications in any subset or multiplicity of commonly-used digital RF communications bands, such as 2.4 GHz, 2.9 GHz, 5.9 GHz, unlicensed MHz bands, or bands.

The aforementioned examples of antenna modules 90 include single or MIMO antenna elements for unidirectional, multi-directional, or omni-directional. They may take the form of a whip, a dipole, a multi-pole, a planar array, or a set of multiple antennas and types. The amplification and processing electronics to which an antenna module is coupled may be located within light bar housing 26 or elsewhere on a light bar-equipped vehicle 100 (FIG. 6).

Figure 6:
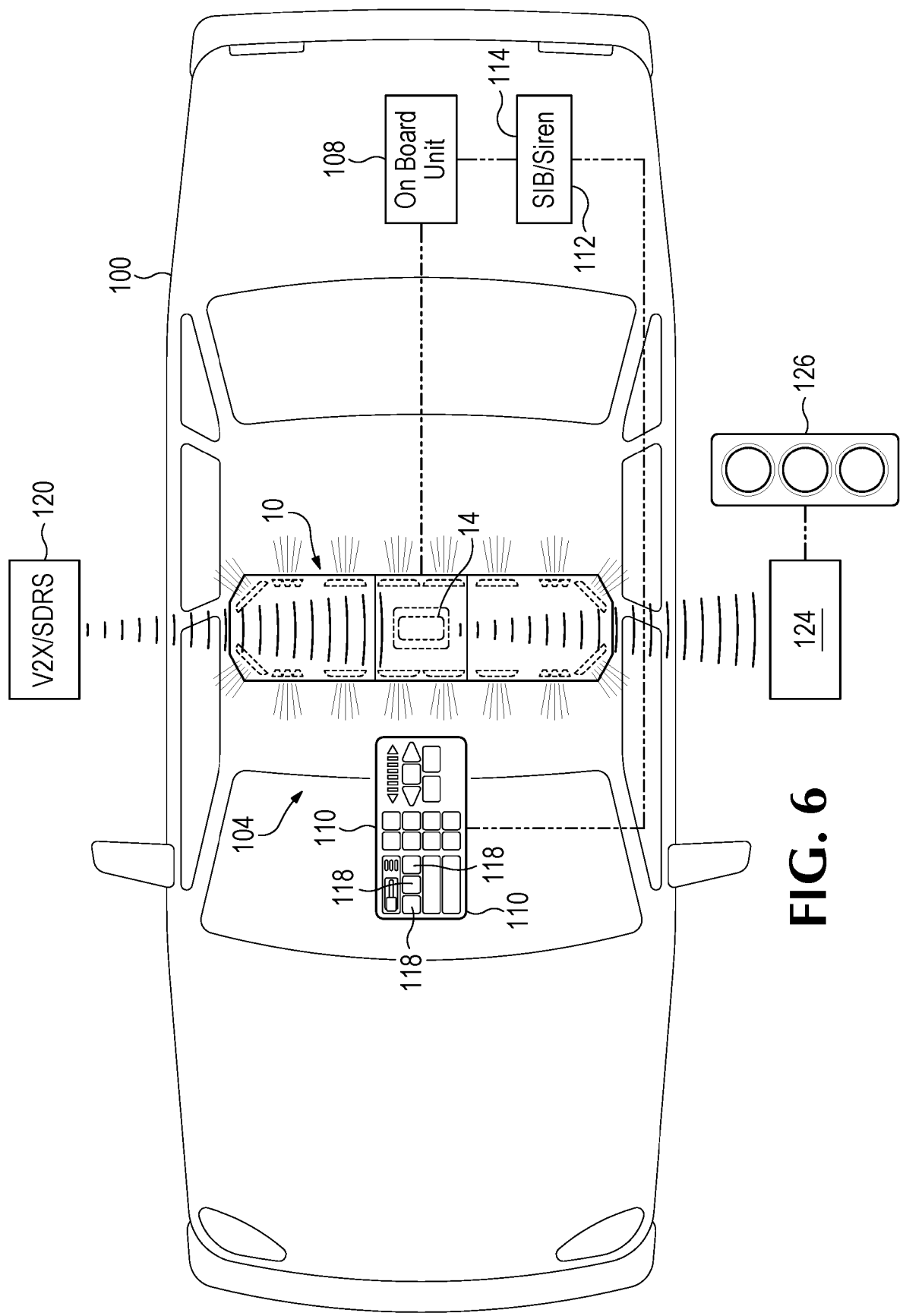
FIG. 6 is a top plan view of a light bar-equipped (e.g., emergency) vehicle having the light bar of FIG. 1 deployed on a roof of the vehicle so as to send wireless signals to a roadside unit for preempting a red traffic light and to receive wireless signals from a remote sending unit (RSU).

FIG. 6 shows vehicle 100 including a V2X system 104 comprised of three components: antenna module 14, which (as described previously) is located in a center section of light bar 10; an on-board unit (OBU) 108 to receive and transmit information using antenna module 14 and to process received wireless message for situational awareness; and a human-machine interface (HMI) 110 installed in the cab of vehicle 100 to control light bar 10 and convey situational awareness information (e.g., audible or visual alerts).

In the present example, HMI 110 is an illuminated keypad communicatively coupled to a serial-interface board (SIB) 112 of a siren 114. An example of these components is the Z3 siren system available from the present applicant, Code 3, Inc. Using the Matrix Configurator™, which is described in International Application No. PCT/US2019/020132 of Latham et al., a user selects when they want OBU 108 to transmit, via antenna module 14, a state of light bar 10 or other vehicle status indication. For example, a user could configure alert level 1, 2, and 3 keys 118 to signal to OBU 108 to generate a J2735 light bar in use data element for a BSM when lighting devices 72 or 82 are actuated, a J2735 emergency vehicle alert message, or other type of wireless message indicating that vehicle 100 is a light bar-equipped (e.g., emergency) vehicle. Other HMIs are also contemplated. For example, a touchscreen or OLED display panel may be used for an HMI.

An example OBU is an AutoLink available from Danlaw, Inc. This type of OBU connects two input, analog, 12V wires to two, analog output wires on siren 114. Other OBUs optionally connect via a controller area network (CAN) bus (not shown), e.g., through which the OBU appears as a CAN node so as to receive from vehicle 100 CAN messages indicating transmission gear, vehicle speed, turn signal state, and other CAN messages such as GPS location and vehicle status information.

OBU 108 causes antenna module 14 to wirelessly convey information, depending on how a user configures system 104. In one example configuration shown in FIG. 6, OBU 108 may constantly receive via antenna module 14 wireless messages from an RSU 120, which may be installed at traffic intersections or other places in a city. Similarly, OBU 108 also may receive wireless messages from other vehicles having V2X/DSRC antennas (and OBUs).

If OBU 108 receives a message that another light bar-equipped vehicle is approaching or that vehicle 100 is approaching an intersection, HMI 110 optionally warns the driver. Likewise, if the state of light bar 10 represents an emergency state and a J2735 light bar in use data element is included for wireless transmission, then an RSU 124 may automatically change an illumination pattern or light timing of a traffic light 126 such that vehicle 100 need not wait at a red light. For example, when siren 114 is actuated at a level 1, level 2, or level 3 via a press of one of buttons 118, SIB 112 or siren 114 apply I/O logic levels to OBU 108. In response, OBU 108 generates, for transmission via antenna module 14, a signal communicating that vehicle 100 is, e.g., a 2017 Law Enforcement Dodge Charger, its present location, its heading, its speed, and other optional information about the illumination state of light bar 10 or audible state of siren 114. OBU 108 will continue causing a refreshed transmission until level 1, level 2, or level 3 are disengaged.

Skilled persons will appreciate that many changes may be made to the details of the above-described embodiments without departing from the underlying principles of the invention. For example, an OBU is an optional component that can be fully integrated into the HMI or the light bar. Also, an antenna-equipped light bar could be used on a tow truck or other authorized vehicle. The scope of the present invention should, therefore, be determined only by the following claims.

The invention claimed is:

1. An antenna-equipped light bar, comprising:
   a light bar housing in which are mounted lighting devices communicatively coupled to electrical circuitry;
   a cover for the light bar housing, the cover including a domed region and a major surface region, the domed region defining an interior cavity for which at least a portion of the interior cavity is located above a plane defined by the major surface region;
   a shielding panel located in the light bar housing and electrically isolated from the electrical circuitry coupled to the lighting devices, the shielding panel positioned in the light bar housing to provide shielding of electromagnetic interference (EMI) associated with the electrical circuitry coupled to the lighting devices, in which the shielding panel is integrated into the cover; and
   an antenna mounted atop the shielding panel so as to be at least partly shielded from the EMI.

2. The antenna-equipped light bar of claim 1, in which at least a portion of the antenna is located in the interior cavity and above the plane.

3. The antenna-equipped light bar of claim 1, in which the domed region is centrally located in the cover.

4. The antenna-equipped light bar of claim 1, in which the lighting devices are mounted at locations below the shielding panel.

5. The antenna-equipped light bar of claim 1, in which the antenna comprises a multi-element antenna module.

6. The antenna-equipped light bar of claim 1, in which the antenna includes a cellular antenna configured for cellular V2X wireless communications.

7. A system, comprising:
   an antenna-equipped light bar, including:
      a light bar housing in which are mounted lighting devices communicatively coupled to electrical circuitry;
      a shielding panel located in the light bar housing and electrically isolated from the electrical circuitry coupled to the lighting devices, the shielding panel positioned in the light bar housing to provide shielding of electromagnetic interference (EMI) associated with the electrical circuitry coupled to the lighting devices; and
      an antenna mounted atop the shielding panel so as to be at least partly shielded from the EMI;
   a human-machine interface (HMI); and
   an on-board unit for converting from first electrical signals into second electrical signals, the first electrical signals being generated by the HMI indicating that the lighting devices are on, and the second electrical signals being generated by the on-board unit for wireless broadcast using the antenna.

8. The system of claim 7, in which the HMI triggers the on-board unit to cause the antenna to wirelessly broadcast a J2735 light bar in use data element.

9. The system of claim 7, in which the HMI triggers the on-board unit to cause the antenna to wirelessly broadcast a J2735 emergency vehicle alert message.

10. The system of claim 7, further comprising a serial-interface board (SIB), in which the SIB communicatively couples to the on-board unit and the HMI.

11. The system of claim 7, in which the wireless broadcast using the antenna indicates that a vehicle carrying the system is a light bar-equipped vehicle.

12. The system of claim 11, in which the HMI triggers the on-board unit to cause the antenna to wirelessly broadcast a state of a light bar deployed on the vehicle to change a traffic light.

13. The system of claim 7, in which the HMI is one or more of a touchscreen, keypad, or OLED display panel.

14. The system of claim 7, in which the on-board unit is configured as a CAN node.

15. The system of claim 7, in which the on-board unit is configured to receive, via the antenna, wireless messages from a road-side unit.

16. The system of claim 7, in which the on-board unit is configured to receive, via the antenna, wireless messages from another vehicle having a V2X or DSRC antenna.

17. The system of claim 7, further comprising a cover for the light bar housing, the cover including a domed region and a major surface region, the domed region defining an interior cavity for which at least a portion of the interior cavity is located above a plane defined by the major surface region.

18. The antenna-equipped light bar of claim 17, in which at least a portion of the antenna is located in the interior cavity and above the plane.

19. The antenna-equipped light bar of claim 17, in which the domed region is centrally located in the cover.

20. The antenna-equipped light bar of claim 7, in which the lighting devices are mounted at locations below the shielding panel.

21. The antenna-equipped light bar of claim 7, in which the antenna comprises a multi-element antenna module.

22. The antenna-equipped light bar of claim 7, in which the antenna includes a cellular antenna configured for cellular V2X wireless communications.

23. An antenna-equipped light bar, comprising:
a light bar housing in which are mounted lighting devices communicatively coupled to electrical circuitry;
a shielding panel located in the light bar housing and electrically isolated from the electrical circuitry coupled to the lighting devices, the shielding panel positioned in the light bar housing to provide shielding of electromagnetic interference (EMI) associated with the electrical circuitry coupled to the lighting devices, in which the shielding panel includes one or more lateral shielding panels and central ground plane on which the antenna is mounted; and
an antenna mounted atop the shielding panel so as to be at least partly shielded from the EMI.

24. The antenna-equipped light bar of claim 23, further comprising a cover for the light bar housing, the cover including a domed region and a major surface region, the domed region defining an interior cavity for which at least a portion of the interior cavity is located above a plane defined by the major surface region.

25. The antenna-equipped light bar of claim 24, in which at least a portion of the antenna is located in the interior cavity and above the plane.

26. The antenna-equipped light bar of claim 24, in which the domed region is centrally located in the cover.

27. The antenna-equipped light bar of claim 22, in which the lighting devices are mounted at locations below the shielding panel.

28. The antenna-equipped light bar of claim 22, in which the antenna comprises a multi-element antenna module.

29. The antenna-equipped light bar of claim 22, in which the antenna includes a cellular antenna configured for cellular V2X wireless communications.

* * * * *